(12) United States Patent
Dunkel (10) Patent No.: US 11,174,057 B2
(45) Date of Patent: Nov. 16, 2021

(54) METHOD FOR PACKAGING AND PROCESSING FOOD PRODUCTS

(71) Applicant: Weber Maschinenbau GmbH Breidenbach, Breidenbach (DE)

(72) Inventor: Michael Dunkel, Werther (DE)

(73) Assignee: Weber Maschinenbau GmbH Breidenbach, Breidenbach (DE)

( * ) Notice: Subject to any disclaimer, the term of this patent is extended or adjusted under 35 U.S.C. 154(b) by 484 days.

(21) Appl. No.: 16/321,597

(22) PCT Filed: Jul. 25, 2017

(86) PCT No.: PCT/EP2017/068719
§ 371 (c)(1),
(2) Date: Jan. 29, 2019

(87) PCT Pub. No.: WO2018/019810
PCT Pub. Date: Feb. 1, 2018

(65) Prior Publication Data
US 2021/0276756 A1    Sep. 9, 2021

(30) Foreign Application Priority Data

Jul. 29, 2016 (DE) .......................... 102016114091.0

(51) Int. Cl.
*B65B 35/04*    (2006.01)
*B65B 35/06*    (2006.01)
(Continued)

(52) U.S. Cl.
CPC .............. *B65B 57/04* (2013.01); *B25J 9/0093* (2013.01); *B25J 11/0045* (2013.01);
(Continued)

(58) Field of Classification Search
CPC ......... B65B 35/04; B65B 35/06; B65B 35/10; B65G 47/42
(Continued)

(56) References Cited

U.S. PATENT DOCUMENTS 4,974,719 A    12/1990    Chenevard
6,059,508 A *  5/2000    Wunscher ................ B65G 1/08
                                                        198/370.01
(Continued)

FOREIGN PATENT DOCUMENTS

| DE | 29817239 U1 | 1/1999 |
|----|----|----|
| DE | 69618676 T2 | 9/2002 |
| DE | 102007017035 A1 | 10/2008 |
| DE | 102007028680 A1 | 12/2008 |
| DE | 102014221232 A1 | 4/2016 |
| EP | 2233400 A1 | 9/2010 |
| JP | 3844546 B2 | 11/2006 |

OTHER PUBLICATIONS

US 2012/0163953 A1, Jun. 28, Murano et al. (Year: 2012).*

*Primary Examiner* — Douglas A Hess
(74) *Attorney, Agent, or Firm* — Richard M. Goldberg

(57) ABSTRACT

A method for packaging and processing products in a continuously operating production line, including filling individual packaging containers with products in a filling station; dispensing the filled containers to an individualizing device in multiple tracks by a dispensing station, the individualizing device transferring the packaging containers onto a single track of a conveyor; transporting the containers by the conveyor one after another to at least one additional processing station, and operating the individualizing device in one of the following three operating modes:

a) a normal mode in which the packaging containers are transferred from the dispensing station onto the single track of the conveyor,    b) an on-stock mode in which the packaging containers are transferred from the dispensing station to a temporary store, and (Continued)

c) a low-load mode in which the packaging containers are transferred from the temporary store onto the single track of the conveyor.

10 Claims, 5 Drawing Sheets

(51) Int. Cl.
  *B65B 35/10* (2006.01)
  *B65G 47/42* (2006.01)
  *B65B 57/04* (2006.01)
  *B25J 9/00* (2006.01)
  *B25J 11/00* (2006.01)
  *B65B 25/06* (2006.01)
  *B65B 61/28* (2006.01)
  *B65G 47/68* (2006.01)
  *B65B 35/38* (2006.01)

(52) U.S. Cl.
  CPC ............ *B65B 25/065* (2013.01); *B65B 35/04* (2013.01); *B65B 35/38* (2013.01); *B65B 61/28* (2013.01); *B65G 47/42* (2013.01); *B65G 47/681* (2013.01); *B65G 2201/0202* (2013.01); *B65G 2203/0241* (2013.01)

(58) Field of Classification Search
  USPC ................................ 198/347.1, 347.4, 418.6
  See application file for complete search history.

(56) References Cited

U.S. PATENT DOCUMENTS

| | | | | |
|---|---|---|---|---|
| 6,122,895 | A * | 9/2000 | Schubert | B65B 5/12 53/240 |
| 6,520,317 | B2 * | 2/2003 | Sherwin | B65B 5/105 198/436 |
| 7,229,110 | B1 | 6/2007 | Tye | |
| 7,728,244 | B2 * | 6/2010 | De Leo | B07C 3/087 209/583 |
| 7,877,164 | B2 * | 1/2011 | Grunbach | G06Q 10/087 700/217 |
| 8,491,249 | B2 * | 7/2013 | Monti | B65G 47/90 414/268 |
| 8,565,912 | B2 * | 10/2013 | Wappling | B25J 9/1687 700/217 |
| 8,585,347 | B2 * | 11/2013 | Lanigan, Sr. | B65G 63/045 414/809 |
| 8,616,822 | B2 * | 12/2013 | Winkler | B65B 5/04 414/276 |
| 9,254,930 | B2 * | 2/2016 | Cremer | B65G 1/1378 |
| 9,327,397 | B1 * | 5/2016 | Williams | B25J 3/04 |
| 9,604,782 | B2 * | 3/2017 | Winkler | B65G 1/1375 |
| 9,623,992 | B2 * | 4/2017 | Davi | B65B 35/54 |
| 9,908,646 | B2 * | 3/2018 | Renner | B65B 35/36 |
| 10,315,843 | B2 * | 6/2019 | Magens | B65G 1/0492 |
| 10,954,064 | B2 * | 3/2021 | Bretz | B65G 1/1378 |
| 2012/0163953 | A1 | 6/2012 | Murano et al. | |

* cited by examiner

| | |
|---:|:---|
| ID: | |
| Product: | |
| Track: | |
| Row: | |
| Error status: | |
| Temporary store: | Carriage: [ ]<br>Shelf: [ ]<br>Track: [ ]  Row: [ ]<br>Cold store addres: [ ] |
| Serial No.: | |
| Label text: | |
| Packet: | |
| Slip text: | |
| Shipment address: | |

Fig. 7

METHOD FOR PACKAGING AND PROCESSING FOOD PRODUCTS

BACKGROUND OF THE INVENTION

The invention relates to a method for packaging and processing food products or medical products in a continuously operating production line, wherein individual packaging containers are filled with products in a filling station; the filled packaging containers are dispensed to an individualizing device in multiple tracks by a dispensing station, said individualizing device transferring the packaging containers onto an single track of a conveyor; and the packaging containers are transported by the conveyor one after the other to at least one additional processing station on the production line.

Packing containers for food products, e.g. deep-drawn plastic containers, are frequently formed and supplied in a condition in which a plurality of blanks, i.e. a plurality of physically connected individual containers, are arranged in a plurality of tracks and rows in a rectangular matrix. Therefore, the filling station conveniently operates in such a manner that the products are also supplied in several tracks, so that packaging containers in the same row may be filled simultaneously and in parallel. Once the packaging containers have been sealed and separated from one another, it is convenient for the further processing up to the time of shipping, i.e., for example, for the processes of labelling, sorting, commissioning and/or packaging into larger shipping packets, that the individual packaging containers are conveyed one after the other on a single-track conveyor along which the respective processing stations are arranged. This has the advantage that equipment such as labelling machines and the like for carrying out the processing steps are not required in multitude.

Typically, the production line therefore includes an individualizing device, e.g. in the form of a robot with an articulated arm, which forms the interface between a multi-track upstream branch of the production line and a single-track downstream branch. When the production line operates continuously, the throughput of products in the multi-track branch should be adapted as good as possible to the throughput in the single-track branch.

SUMMARY OF THE INVENTION

It is an object of the invention to achieve an improved utilization of the production line, in particular also in the case of interruptions of operation or delays at a processing station.

According to the invention, this object is achieved by the feature that the individualizing device is operated in one of three operating modes, dependent upon the respective situation:

a) a normal mode in which the packaging containers are transferred from the dispensing station onto the single track of the conveyor, b) an on-stock mode in which the packaging containers are transferred from the dispensing station to a temporary store, and c) a low-load mode in which the packaging containers are transferred from the temporary store onto the single track of the conveyor.

When the number of processing stations that are integrated into a common production line is increased, the likelihood of disruptions in operation, which lead to delays or interrupts at a processing station, will also increase. Up to now, this has had the consequence that the entire production line—from the stage of supplying the food products and supplying or forming the packaging containers to the stage of shipment processing—had to operate at a lower speed or even had to be stopped temporarily. Now, in the method according to the invention, the capability of the individualizing device to handle the packaging containers and to transfer them from one arrangement into another in accordance with a scheme that can be configured flexibly, is utilized for providing a buffer station in the production line and for temporarily buffering products in the temporary store.

If the production speed in the upstream, multi-track branch of the production line is larger than in the downstream, single-track branch, then the individualizing device can operate on-stock and accumulate a supply of filled packaging containers in the temporary store. On the other hand, if there is a delay or interrupt in the upstream branch of the production line, the downstream branch of the production line can still be kept busy by feeding packaging containers from the temporary store into the workflow.

The method is also applicable for production lines which have two or more parallel tracks even in the downstream branch.

Next to food products, the method is also suitable for packaging medical products such as drugs or injection syringes, in particular for sterile packaging.

More specific features and further developments of the invention are indicated in the dependent claims.

The invention also relates to a device for carrying out the method described above.

The temporary store can have the form of a rack with shelves on which the packaging containers can be placed by means of a robot forming the individualizing device, the shelves being arranged one above the other. In this way, a high temporary storage capacity is achieved in the working range of the robot. The storage density in the temporary store can be increased further by configuring the shelves of the rack as pull-out shelves that are disposed one above the other with narrow spacings. Then, the access of the robot to the individual shelves is achieved by pulling-out the respective shelf.

In a useful embodiment, the temporary store is constituted by a plurality of carriages that can be docked on the individualizing device and may also be steered into a storage that is further away from the production line, if necessary. In this way, the temporary storage capacity can be increased substantially. Of course, said carriages may also be configured as racks with pull-out shelves.

In a useful embodiment, the individualizing device is combined with a test station where the filled packaging containers can be checked for any possible defects by means of electronic image processing and/or other sensors. Then, defective packaging containers may be sorted-out automatically by using the individualizing device for transferring them into the temporary store.

In a particularly advantageous embodiment, the individualizing device is provided with an electronic controller that is combined or networked with an electronic product management system. Then, it is possible to track the history of each individual packaging container during the entire production process, possibly including phases in which the packaging container is in the temporary store.

BRIEF DESCRIPTION OF THE DRAWINGS

Embodiment examples will now be described in conjunction with the drawings, wherein.

DETAILED DESCRIPTION

Figure 1:
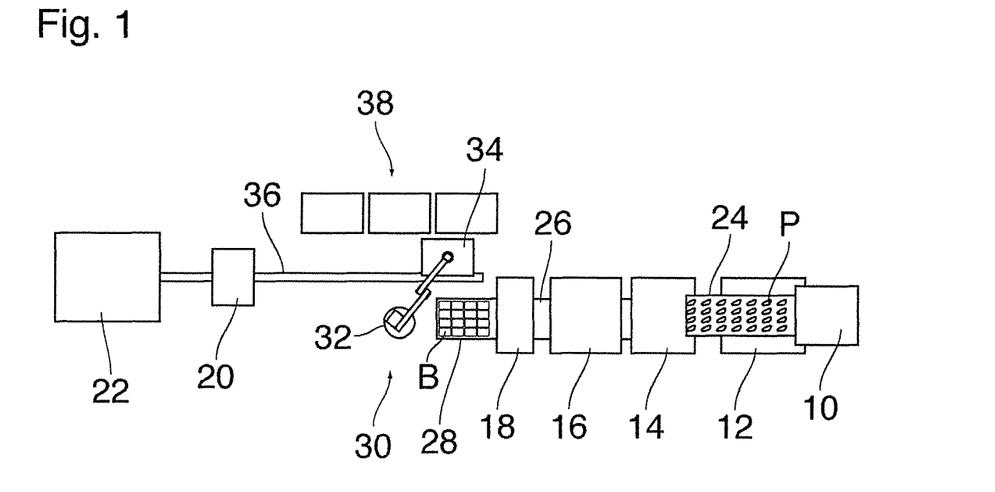
FIG. 1 is a schematic plan view of a production line that is configured for carrying out the method according to the invention.

FIG. 1 schematically shows a production line that serves for example for portioning and packaging meat products P and for further processing the same up to the stage of shipment. The device comprises, from right to left in FIG. 1, a portioning device 10 for portioning the meat products; a deep-drawing machine 12 for forming packaging containers B for the meat products; a filling station 14 where the meat products are placed into the individual packaging containers; a sealing station 16 for sealing the packaging containers with a sealed foil and for separating the packaging containers, that are still interconnected, into individual containers; a test station 18 for checking the quality of the packaging containers and products, a labelling station 20 including an integrated label printer for labelling the packaging containers; and, finally, a shipment station 22, where the packaging containers are packed and prepared for shipment.

A multi-track conveyor 24 serves for conveying the meat products P that have been portioned in the portioning device 10 to the filling station 16 in several (four) parallel tracks. The deep-drawing station 12 is disposed below the multi-track conveyor 24 and creates, in each working stroke, a 4×4 matrix of packaging containers that are integrally connected to one another and are open at the top side, and the packaging containers are transferred to the filling station 14 where the meat products P are placed into the individual packaging containers.

When the packaging containers have been closed in the sealing station 16 and have been separated from one another, they are conveyed—still in four parallel tracks—to the test station 18 and finally to a dispensing station 28 by means of a dispensing conveyor 26.

The dispensing station 28 is formed by an end portion of the dispensing conveyor 26 that is driven intermittently in synchronism with the working stroke of the deep-drawing machine 12. At the dispensing station 28, there is disposed an individualizing device 30 that is formed by an articulated-arm-type robot 32 and a gripper 34 held on the robot arm. In the dispensing station 28, sixteen packaging containers B are supported on the dispensing conveyor 26 in four tracks and four rows, in accordance with the matrix of the containers formed in the deep-drawing machine 12. By means of the gripper 34, these sixteen packaging containers B can be lifted jointly and transferred onto a single-track conveyor 36 on which the packaging containers are moved-on to the labelling station 20 and the shipment station 22.

The gripper 34 is configured such that it can drop the packaging containers B individually onto the conveyor 36 after they have been jointly lifted from the dispensing station 28. In order to transfer all sixteen packaging containers to the conveyor 36, the gripper 34 is at first aligned, by means of the robot 32, such that a track of four packaging containers is disposed above the conveyor 36. These four containers are then dropped. Thereafter, the gripper 34 is moved sideways by one track, so that, after the conveyor 36 has been advanced by four positions, the next track of four packaging containers can be dropped, and so on. Once the last of the four tracks has been transferred onto the conveyor 36, the gripper 34 returns into a position above the dispensing station 28, so that the next matrix of sixteen packaging containers B can be taken-up as soon as it has arrived.

Within the working range of the robot 32 and next to the conveyor 36 there is provided a temporary store 38 in which the packaging containers can be disposed individually or in groups by means of the gripper 34.

Figure 2:
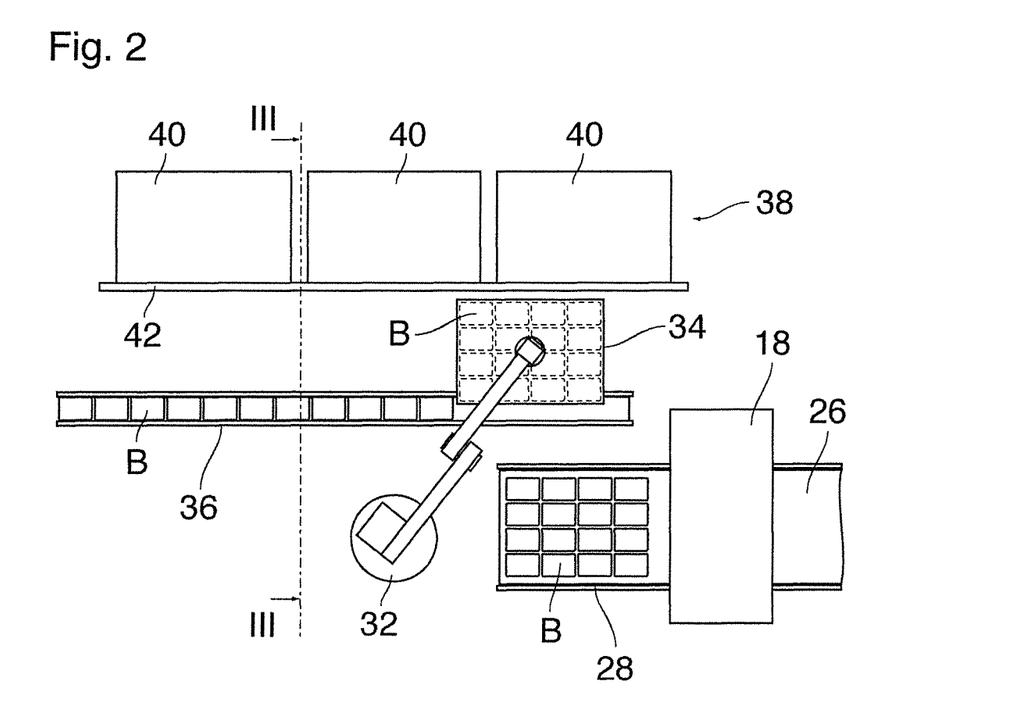
FIG. 2 is an enlarged plan view of parts of the production line shown in FIG. 2.

As can be seen more clearly in FIG. 2, the temporary store 38 is formed by three carriages 40 that are docked to a stationary docking rail 42 in predetermined positions relative to the robot 32, but can be detached from the docking rail individually and independently of one another and can be routed to other places. By docking the carriages 40 to the docking rail 42, it is assured that the coordinates of the placement positions for the packaging containers B on the carriage 40 are precisely defined, so that the robot 32 can be controlled to target these placement positions.

FIG. 2 shows further packaging containers B that are carried away on a single track on the conveyor 36. Other packaging containers B that are held at the bottom side of the gripper 34 are shown in phantom lines.

Figure 3:
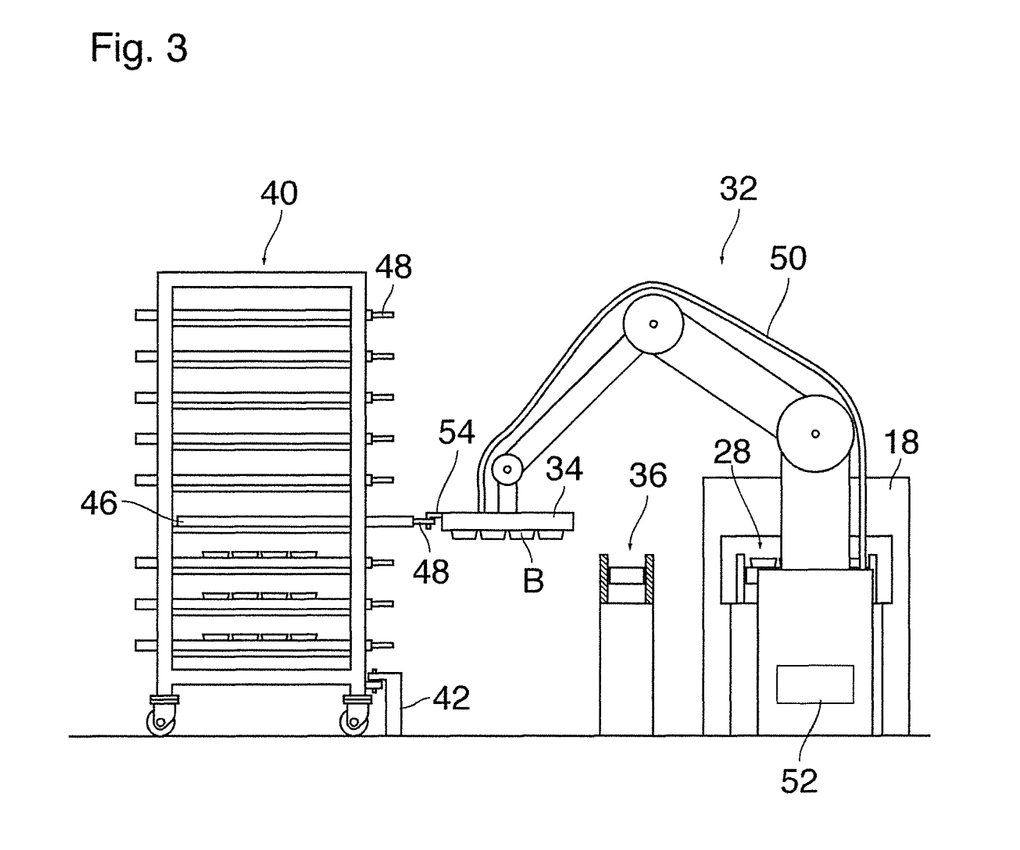
FIG. 3 is a front view of an individualizing device and a temporary store on the production line, as seen from the direction of arrows in FIG. 2.

In FIG. 3, one of the carriages 40 docked to the docking rail 42 has been shown in greater detail. This carriage has a plurality of pull-out shelves 46 disposed one above the other in several levels and each having a handle 48 on the front side.

The gripper 34 on the arm of the robot 32 is configured as a suction gripper in this example and has, as its bottom side, for each of the sixteen take-up positions for the packaging containers B, a suction head that can be activated and deactivated individually, so that the packaging containers can be lifted and dropped individually. A suction hose 50 connects the suction heads of the gripper 34 to a vacuum source, which has not been shown in detail, in the base of the robot 32. In the base of the robot 32, there has also been shown an electronic controller 52 which controls the movements of the robot arm as well as the operation of the suction heads of the gripper 34.

In the example shown, the gripper 34 has a claw 54 with which the gripper 34 can grip the handles 48 of the shelves 46, so that the shelves may be drawn out by means of the robot.

In the situation exemplified in FIG. 3, packaging containers have already been placed in the three lowermost levels of the carriage 40. The next higher shelf is just caught and drawn out by means of the claw of the gripper 34.

Figure 4:
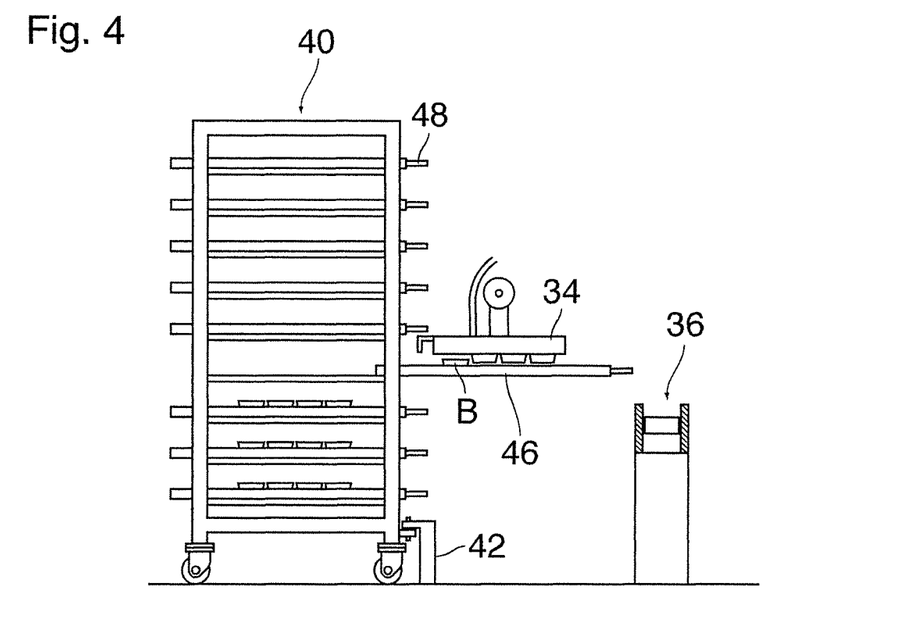
FIGS. 4 and 5 are simplified front views, analogous to FIG. 3, showing different operational states of the individualizing device.

FIG. 4 shows a somewhat later stage of the operation. In this stage, the shelf 46 has been fully drawn out, and the gripper 34 has just dropped one of the packaging containers B (or several packaging containers arranged in the same track) on the shelf 46 which is in the pulled-out position.

Figure 5:
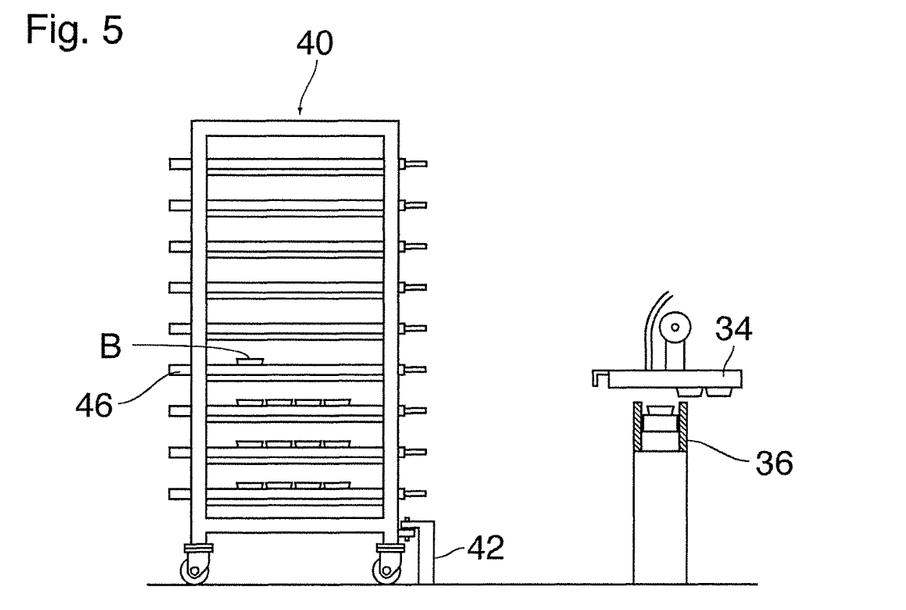

FIG. 5 illustrates yet a later stage in which the shelf 46 on which the packaging container B had been placed, has been pushed back into the carriage 40 by means of the gripper 34. The gripper 34 has been moved to a position above the conveyor 36 and is just placing the packaging containers that have remained in the gripper onto the conveyor 36.

In the like manner, it is also possible to fetch selected packaging containers from the carriage 40 and place them on the conveyor 36 by means of the gripper 34.

The controller 52 of the robot 32 is part of a data processing system or network on which a production management software has been implemented which serves for controlling all operations on the product line. This data processing system also stores a database in which, for each product that is dispensed on the multi-track conveyor 24 by means of the portioning device 10, a data record 56 is created which has the data structure shown in FIG. 6.

Figure 6:
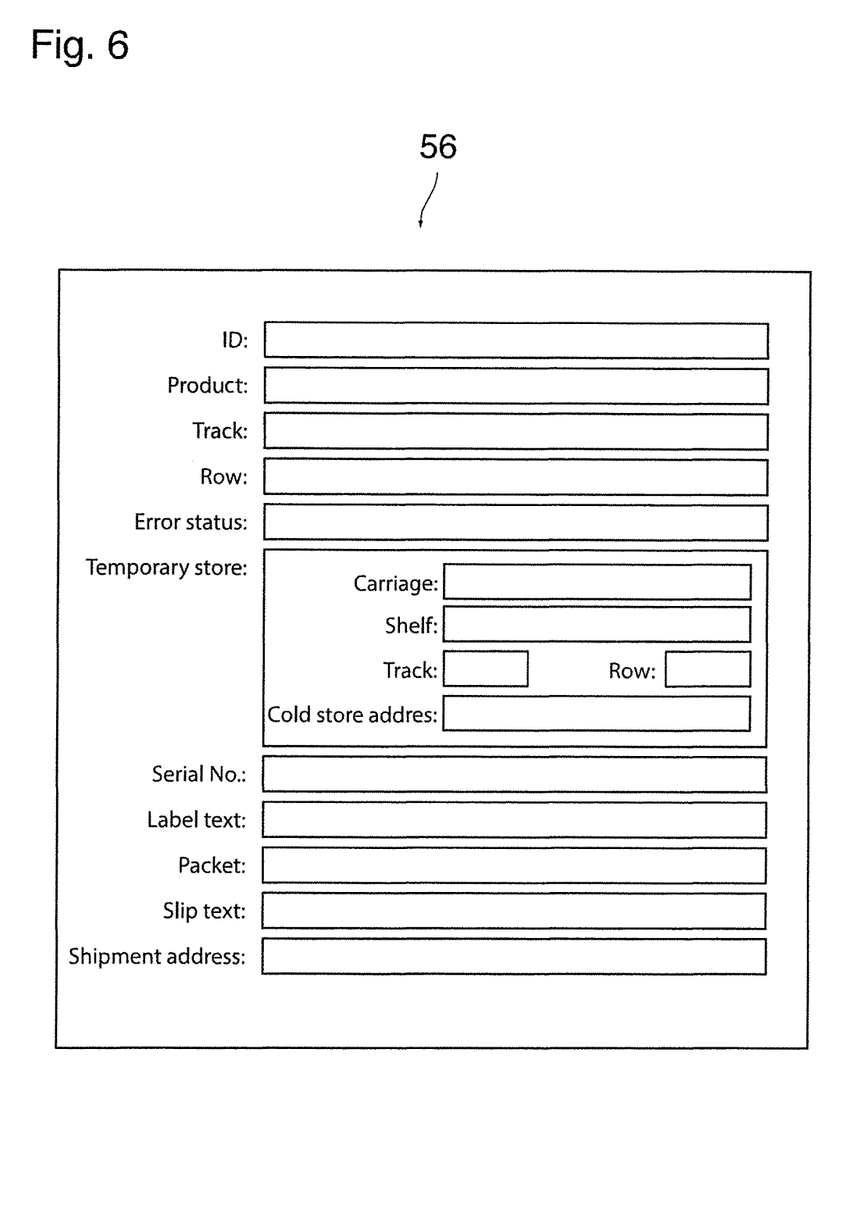
FIG. 6 is an example of a data record in an electronic production management system that is networked with or integrated in an electronic controller of the individualizing device.

A field "ID" contains an identifier that uniquely identifies the product or—more precisely—the corresponding packaging container. A field "Product" contains information on the type and properties of the product (e.g. cutlet or ham) and possibly the origin of the product (stock yard and/or breeder). A field "Track" contains a number between 1 and 4 which indicates the track in which the product is placed on the multi-track conveyor 24 and then, later, on the dispensing conveyor 26. Correspondingly, a field "Row" indicates the row (transverse to the conveying direction) in which the product is placed. The rows of the products placed on the multi-track conveyor 24 are counted continuously as per start of production.

In case that any defect of one of the packaging containers or the product contained therein is detected in the test station 18, the defect is characterized in greater detail in a field "error status" of the corresponding data record. If a defect is detected that makes it necessary to sort-out the corresponding packaging container, then the robot 32 is controlled such that it does not transfer the packaging container to the conveyor 36 but instead places it onto a shelf 46 of the carriage 40 that has been reserved for "rejects".

If the error status requires that a corresponding product and the corresponding packaging container are inspected more closely, the packaging container is disposed in another location on the temporary store 38, and the exact placement position is recorded in a field "Temporary store" in the data record 56. To that end, the field "Temporary store" has sub-fields "Carriage", "Shelf", "Track" and "Row". These fields identify the carriage 40 and the shelf 46 on which the placement position is located. The fields "Track" and "Row" identify the exact placement position on the shelf. The containers are always placed in the 4×4 raster in which also the suction heads of the gripper 34 are arranged. Accordingly, the field "Row" can only assume the values between 1 and 4.

If the inspection of the product shall take place at a later time, the carriage 40 on which the product has been placed can be detached from the docking rail 42 and can be routed to another location, e.g. a cold store. In that case, the storage location is recorded in a field "Cold store address".

Once the corresponding carriage 40 has been docked again to a free docking position on the docking rail 42, the packaging container that had previously been placed in the temporary store can automatically be retrieved and can be taken-up again.

Whenever a packaging container is placed on the single-track conveyor 36 by means of the gripper 34, a serial number is assigned to this packaging container and is recorded in a field "Serial No." in the corresponding data record 56. This happens regardless of whether the packaging container in consideration has been taken out of the temporary store 38 or from the dispensing station 28. The serial numbers are also counted continuously as per start of production. These serial numbers offer the possibility to uniquely identify the corresponding packaging container B also in the subsequent processing stations, i.e. the labelling station 20 and the shipment station 22 in this example.

A field "Label text" can store a text that is printed in the labelling station 20 onto a label that will then be attached to the packaging container.

A field "Packet" identifies a larger packet, e.g. a shipment box, in which the packaging container B in consideration is packed together with other packaging containers. Other fields "Slip text" and "Shipment address" can further store, for each packet, a text to be printed on the delivery slip as well as a shipment address.

The database described above permits to record the history of each individual packaging container and the product contained therein, irrespective of whether the products are directly transferred from the dispensing station 28 to the conveyor 36 or are temporarily buffered in the temporary store 38 or any other place.

The production line may for example be operated such that, on start of production, an "on-stock" mode of operation is initially used for a certain time, which means that the packaging containers arriving at the dispensing station 28 are placed in the temporary store 38. When a certain stock of packaging containers has been built-up in this way in the temporary store, operation is switched to a "normal mode" and the packaging containers which will then arrive at the dispensing station 28 are directly transferred onto the conveyor 36 and moved-on to the shipment station 22. If the operation is interrupted at any place upstream of the dispensing station 28 or if a malfunction slows down the operation of the multi-track branch of the production line ("low-load mode"), then the sites on the conveyor 36 that remain empty for that reason are filled with packaging containers from the temporary store 38, so that the labelling station 20 and the shipment station 22 can continue to operate at full capacity in spite of the disruption.

If, conversely, a disruption occurs at any processing station on the single-track conveyor 36, the mode of operation of the robot 32 is alternatingly switched between normal mode and on-stock mode, so that the packaging containers arriving at the dispensing station 28 are transferred onto the conveyor 36 as long as sufficient sites are available on this conveyor 36, and if there are no free sites, the packaging containers are instead disposed in the temporary store 38.

Whenever, due to a recognized error or for any other reason, individual packaging containers or entire batches of packaging containers have to be diverted from the running production, this can easily be achieved by temporarily switching to the on-stock mode, and the entries in the field "Temporary store" permit to retrieve the required products at any time and to re-introduce them into the production process on demand.

Figure 7:
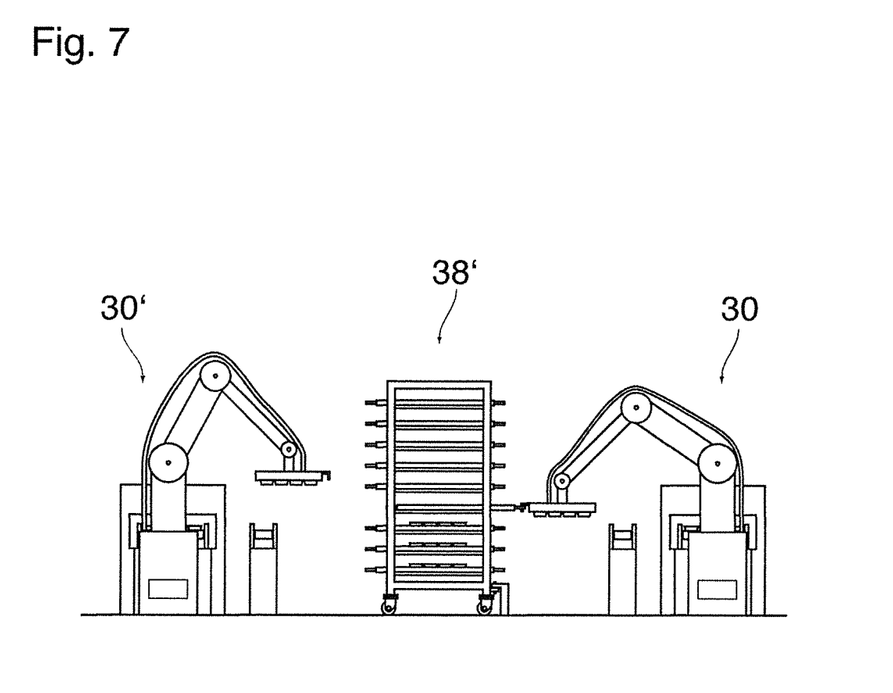
FIG. 7 shows a temporary store that can be utilized by two production lines in common.

FIG. 7 shows an embodiment example in which two production lines, each of which contains an individualizing device 30 and 30', respectively, are linked by a common temporary store 38'. In this case, the temporary store can be serviced from both sides by the individualizing devices 30, 30'. In this process, the temporary store may be utilized in the same way as in the examples described above. In addition, it is possible to transfer products from one production line to the other so as to compensate for differences in capacity usage in the production lines.

What is claimed is:

1. A method for packaging and processing food products or medical products in a continuously operating production line, comprising the steps of:

filling individual packaging containers with products in a filling station;

dispensing the filled packaging containers to an individualizing device in multiple tracks via a dispensing station;

transferring, by said individualizing device, the packaging containers onto a single track of a conveyor;

transporting the packaging containers by the conveyor one after the other to at least one additional processing station on the production line, and operating the individualizing device in one of the following three operating modes:

a) a normal mode in which the packaging containers are transferred from the dispensing station onto the single track of the conveyor, b) an on-stock mode in which the packaging containers are transferred from the dispensing station to a temporary store, and c) a low-load mode in which the packaging containers are transferred from the temporary store onto the single track of the conveyor.

2. The method according to claim 1, at a start of a production run, further comprising the steps of:

initially using the on-stock mode for a certain time, then switching operation to the normal mode after a certain stock of packaging containers has been built-up in the temporary store, and then, in case of a disruption of operation in the production line upstream of the dispensing station, switching operation to the low-load mode.

3. The method according to claim 1, in case of a disruption in the production line downstream of the individualizing device, further comprising the step of switching the operation to the on-stock mode.

4. The method according to claim 1, at least in the on-stock mode, further comprising the step of creating a data record for each packaging container that reaches the dispensing station, said data record storing a placement position of the packaging container in the temporary store.

5. The method according to claim 1, further comprising the step of temporarily uncoupling at least a part of the temporary store from the production line and moving the temporary store to another storage location.

6. The method according to claim 1, further comprising the steps of:

subjecting the packaging containers, at latest when they reach the individualizing device, to a quality test, and sorting out packaging containers, for which a defect has been detected, into the temporary store by the individualizing device.

7. The method according to claim 1, further comprising the steps of:

operating two said production lines in parallel, and using a temporary store by individualizing devices of the two production lines in common.

8. A software product comprising program code stored on a non-transitory machine-readable medium and configured to cause a controller of a production line to carry out the method according to claim 1.

9. A production line for packaging and processing food products or medical products, the production line comprising:

a filling station for filling packaging containers with products;

a dispensing station configured to take up the packaging containers that have been filled in the filling station in several parallel tracks;

an individualizing device for transferring the packaging containers from the dispensing station onto a single track of a conveyor;

at least one further processing station arranged on the conveyor; and a temporary store;

wherein the individualizing device is associated with the temporary store, and the individualizing device is configured for transferring packaging containers from the dispensing station into the temporary store and transferring packaging containers from the temporary store onto the conveyor.

10. The production line according to claim 9, further comprising an electronic controller which is programmed to carry out the method of:

filling individual packaging containers with products in the filling station;

dispensing the filled packaging containers to the individualizing device in multiple tracks via the dispensing station;

transferring, by said individualizing device, the packaging containers onto a single track of the conveyor;

transporting the packaging containers by the conveyor one after the other to the at least one further processing station on the production line, and operating the individualizing device in one of the following three operating modes:

a) a normal mode in which the packaging containers are transferred from the dispensing station onto the single track of the conveyor, b) an on-stock mode in which the packaging containers are transferred from the dispensing station to the temporary store, and c) a low-load mode in which the packaging containers are transferred from the temporary store onto the single track of the conveyor.

* * * * *